United States Patent
Han et al.

(10) Patent No.: US 10,230,411 B2
(45) Date of Patent: Mar. 12, 2019

(54) METHOD AND APPARATUS FOR DISCRIMINATING BETWEEN VOICE SIGNALS

(71) Applicant: MOTOROLA SOLUTIONS, INC, Chicago, IL (US)

(72) Inventors: Jian Han, Chengdu (CN); Charles H Carter, Sunrise, FL (US); Jesus F Corretjer, Weston, FL (US); Meng-Ge Duan, Chengdu (CN); Yi Gao, Chengdu (CN); Cheah Heng Tan, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 242 days.

(21) Appl. No.: 15/127,469

(22) PCT Filed: Apr. 30, 2014

(86) PCT No.: PCT/CN2014/076598
§ 371 (c)(1),
(2) Date: Sep. 20, 2016

(87) PCT Pub. No.: WO2015/165076
PCT Pub. Date: Nov. 5, 2015

(65) Prior Publication Data
US 2017/0149461 A1     May 25, 2017

(51) Int. Cl.
*H04B 1/10* (2006.01)
*G10L 21/0364* (2013.01)
(Continued)

(52) U.S. Cl.
CPC ........ *H04B 1/1018* (2013.01); *G10L 21/0205* (2013.01); *G10L 21/0364* (2013.01);
(Continued)

(58) Field of Classification Search
None
See application file for complete search history.

(56) References Cited

U.S. PATENT DOCUMENTS

| 7,933,226 B2 | 4/2011 | Woodruff et al. |
| 7,970,115 B1 | 6/2011 | Coughlan et al. |

(Continued)

FOREIGN PATENT DOCUMENTS

| CN | 1714599 A | 12/2005 |
| CN | 103227650 A | 7/2013 |

(Continued)

OTHER PUBLICATIONS

Mesgarani N, Shamma S, Grant KW, Duraiswami R, Augmented intelligibility in simultaneous multi-talker environments, Proc. International Conference on Auditory Display (ICAD'03), 71-74.

(Continued)

*Primary Examiner* — Paul W Huber
(74) *Attorney, Agent, or Firm* — Barbara R. Doutre; Scott Garrett (57) ABSTRACT

A method and apparatus for distinguishing voice signals that are played together over the same speaker employs spectral reshaping of one or more of the audio signals. The spectral reshaping shifts modifies the timber of the voice signal while not modifying the pitch of the voice signal. Additional techniques can be used to further distinguish voice signals, such as dynamic gain offset and frequency shifting. After processing one or more signals to spectrally reshape them, they can be played over the same speaker. A user hearing the resulting acoustic signal will be more able to distinguish between the multiple voice signals being played.

20 Claims, 8 Drawing Sheets

(51) Int. Cl.
*H04M 9/08* (2006.01)
*G10L 21/02* (2013.01)
*G10L 25/21* (2013.01)
*G10L 25/78* (2013.01)
*H04B 1/00* (2006.01)

(52) U.S. Cl.
CPC .............. *G10L 25/21* (2013.01); *G10L 25/78* (2013.01); *H04B 1/0057* (2013.01); *H04M 9/082* (2013.01)

(56) References Cited

U.S. PATENT DOCUMENTS

| | | |
|---|---|---|
| 8,204,252 B1 | 6/2012 | Avendano |
| 2004/0052218 A1 | 3/2004 | Knappe |
| 2006/0106603 A1 | 5/2006 | Boillot et al. |
| 2006/0270467 A1 | 11/2006 | Song et al. |
| 2007/0177743 A1 | 8/2007 | Mertens |
| 2007/0197248 A1 | 8/2007 | Reich et al. |
| 2011/0128132 A1 | 6/2011 | Ullrich et al. |

FOREIGN PATENT DOCUMENTS

| | | |
|---|---|---|
| WO | 2007064121 A1 | 6/2007 |
| WO | 2007141682 A1 | 12/2007 |
| WO | 2010048620 A1 | 4/2010 |
| WO | 2013142724 A2 | 9/2013 |

OTHER PUBLICATIONS

Asian, P.F. (1999). "Fundamental frequency and the intelligibility of competing voices," Proceeding of the 14th International Conference of Phonetic Sciences, 179-182.

Yost, W. A., Dye, R.H., and Sheft, S. (1996). "A simulated 'Cocktail Party' with up to three sound sources," Perception and Psychophysics. 58, 1026-1036.

Virag, N., "Single Channel Speech Enhancement Based on Masking Properties of the Human Auditory System", IEEE Trans. on Speech and Audio Proc., vol. 7, No. 2, Mar. 1999.

The International Search Report and the Written Opinion, PCT Patent Application No. PCT/CN2014/076598, filed: Apr. 30, 2014, all pages.

The Extended European Search Report, corresponding patent application No. 14890530.0 dated Apr. 30, 2014, all pages.

Australian Government, Examination report No. 1 for standard patent application, corresponding patent application No. 2014392531, dated Apr. 30, 2014, all pages.

METHOD AND APPARATUS FOR DISCRIMINATING BETWEEN VOICE SIGNALS

FIELD OF THE DISCLOSURE

The present disclosure relates generally to two-way radio operation, and more particularly to receiving two or more voice signals contemporaneously at a two-way radio device and playing both voice signals over the same speaker.

BACKGROUND

Portable two-way radio devices and two-way radio systems in general are utilized in a variety of organizations where near-instant communication is often critical, and monitoring the communication occurring among others in the organization allows collaboration and coordination. Some conventional two-way radios can only receive on one channel at a time. In recent years two-way radios have been designed to monitor a primary channel and monitor one or more other channels or talk groups, but they could still only receive on one channel at a time. More recently portable two-way radio devices have been designed with "dual watch" capability that allows simultaneous reception of two channels, with the audio for each channel being mixed together and played over a single speaker. Thus, dual watch radios allow a user to hear two different voices, including when they speak at the same time.

People often listen to multiple different voices at the same time in person. However, unlike in-person conversation, where our binaural sense of hearing helps to allows us to distinguish different conversations, and considering that transmitters band-limit voice signals and remove potentially distinctive audio spectral content, it is often very hard to distinguish between the voices of two audio streams being played over a single speaker. Simply making one stream louder can obscure the other voice stream and render it unintelligible. In fact, given the filtering that occurs at the transmitter, even when the speakers are not speaking at the same time it can be difficult to determine the identity of either the person speaking or the channel on which they are speaking.

Accordingly, there is a need for a method and apparatus for allowing a listener to be able to discriminate between two channels that are played over the same speaker.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Well known elements, structure, or processes that would be necessary to practice the invention, and that would be well known to those of skill in the art, are not necessarily shown and should be assumed to be present unless otherwise indicated.

DETAILED DESCRIPTION

Embodiments include a method for differentiating audio signals when played together over a speaker. The method can include receiving, at the same time, a primary audio signal on a primary channel and a secondary audio signal on a secondary channel. The method can further include spectrally reshaping at least one of the first audio signal or the second audio signal based on spectral content of the other audio signal to produce resulting signals including at least one reshaped signal, mixing the resulting signals, and playing the resulting signals over the speaker.

Embodiments can further include an audio processor having a primary channel path, including a primary automatic gain controller (AGC) followed by a primary spectrum reshaper, that processes a primary audio signal. The audio processor further includes a secondary channel path, including a secondary spectrum reshaper followed by a secondary AGC, that processes a secondary audio signal. The audio processor further includes a voice activity detector that detects voice in the primary audio signal at an output of the primary AGC and a spectrum analyzer that determines spectral content of the primary audio signal and the secondary audio signal. The secondary spectrum reshaper reshapes a spectrum of the secondary audio signal based on spectral content of the primary audio signal. The audio processor further include a mixer that sums the output of the primary channel path and the secondary channel path to produce a mixed signal, and a speaker over which the mixed signal is played.

Figure 1:
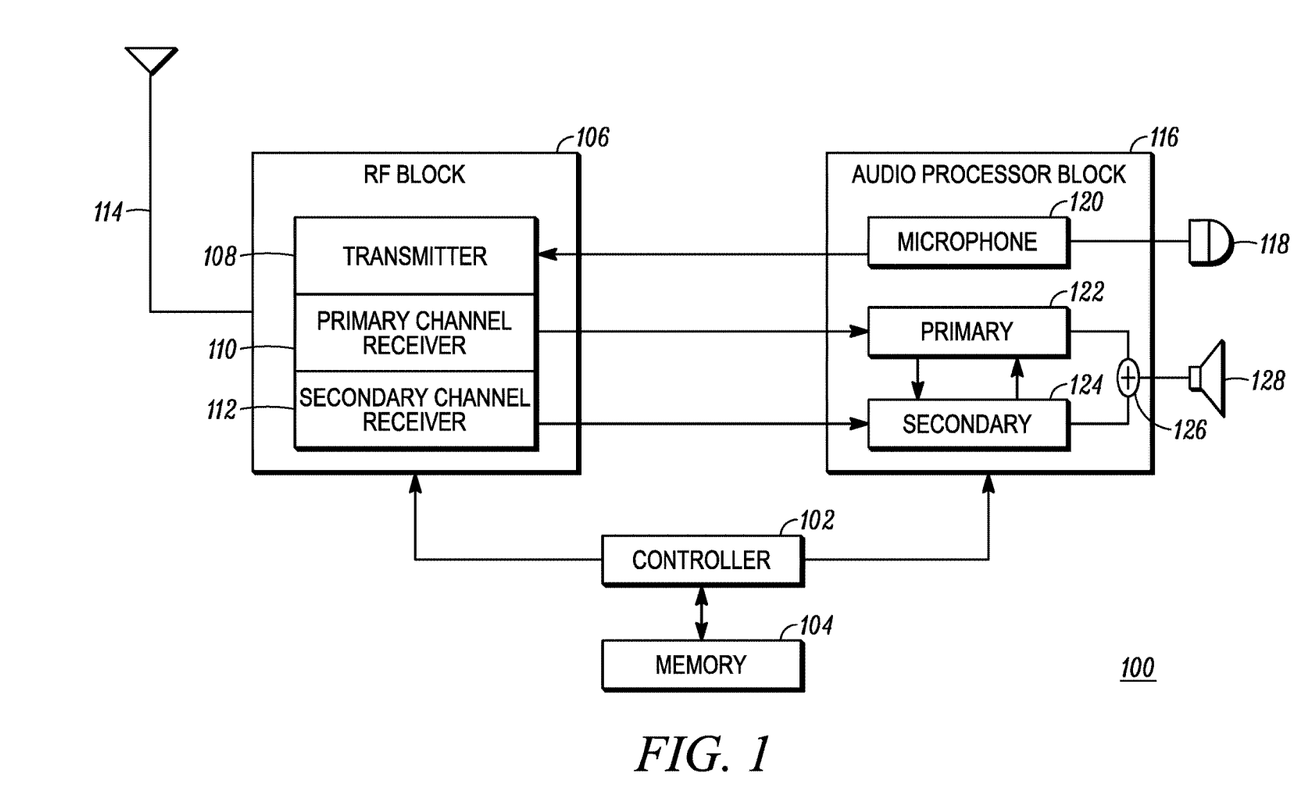
FIG. 1 is a block diagram of a portable two-way radio device in accordance with some embodiments.

FIG. 1 is a block diagram of a portable two-way radio device 100 in accordance with some embodiments. The portable two-way radio device 100 is one example of a device that can process a plurality of audio signals which are played by the device over a common speaker (i.e. in common to all audio signals). In this particular example, the portable two-way radio device 100 includes a "dual watch" capability that allows it to receive over two different channels at the same time. Accordingly, when audio is transmitted by remote parties over those two channels at the same time, the portable two-way radio device 100 receives both audio signals, via modulated radio signals, at the same time, and plays both audio signals over the same speaker at the same time. Without employing an embodiment in accordance with the following disclosure, playing both audio signals at the same time can cause both signals to be unintelligible, and difficult for a listener to aurally distinguish.

The portable two-way radio device 100 includes a controller 102 that, among other operations, executes instruction code that can be stored in a section of memory 104, to which the controller 102 is operably coupled. The memory 104 can represent an aggregate of various types of memory that can be used, accessed, and/or written by the controller 102. Thus, the memory 104 can include random access memory (RAM), read only memory (ROM), re-programmable memory (e.g. Flash memory), and so on. The memory 104 is used to store instruction code for operating the portable two-way radio device 100 as well as for instantiating variables and data structures used by the instruction code. The instruction code causes the portable two-way radio device to operate in accordance with the disclosure and with conventional portable two-way radio device operation, to the extent that it does not conflict with the teachings herein.

The controller 102 is operably coupled to a radio frequency (RF) block 106, which can be a RF transceiver. The RF block 106 includes a transmitter 108, a primary channel receiver 110, and a secondary channel receiver 112, as well as circuitry and components to support the operation of the transmitter 108 and receivers 110, 112, including circuitry for frequency generation and synthesis, filtering, amplification, analog to digital conversion and digital to analog conversion, among others, as is well known. Furthermore, the RF block 106 can include the functionality of one or more processors, such as a digital signal processor. The transmitter 108 can be provided with information for transmission in the form of a signal, such as, for example, an audio voice signal (either digital or analog). The audio voice signal can be used to modulate a carrier wave or waves so that the information can be transmitted by the transmitter 108 via an antenna 114. The transmitter 108 can also transmit other types of signals, including data streams, in some embodiments.

Both the primary channel receiver 110 and the secondary channel receiver 112 can share the antenna 114 with the transmitter 108. Typically, since the portable two-way radio device 100 either transmits or receives (or is in standby mode), an islolator can be used to allow the primary and secondary receivers 110, 112 to share the antenna with the transmitter 108. The primary channel receiver 110 can be tuned to a primary channel and the secondary channel receiver 112 can be tuned to a secondary channel which is different than the primary channel. As used here, the term "channel" refers to a distinct division of the RF medium, which can be defined by, for example, any of frequency, time (i.e. time slot), orthogonal coding, modulation, and other distinctions, as is well known. Accordingly, the primary channel receiver 110 can receive a primary audio signal over the primary channel, and the secondary channel receiver can receive a secondary audio signal over the secondary channel.

The controller 102 can also be operably coupled to an audio processor block 116. The audio processor block 116 processes the audio signals received from, and provided to the RF block 106. The audio processor block 116 can be implemented with a dedicated processor, or it can be a further implementation of a processor that performs other tasks, including tasks of the RF block 106. For transmitting voice signals, a microphone 118 can be used to convert an acoustic sound signal, such as a user's voice, into a corresponding analog electrical signal which is processed by a microphone path 120. The microphone path 120 can, for example, convert the analog audio signal produced by the microphone into a digital audio signal that is provided to the RF block 106 for transmission when transmission operation is commenced by the user (e.g. by pushing a "push to talk" button).

The audio processor block 116 further includes a primary channel path 122 and a secondary channel path 124. The primary channel path 122 processes a primary audio signal provided by the primary channel receiver 110, and the secondary channel path 124 processes a secondary audio signal provided by the secondary channel receiver 112. It will be appreciated by those skilled in the art that the primary and secondary channel path designations may be arbitrary with respect to hardware, and that in some embodiments the primary and secondary channel paths 122, 124 can be realized using the same hardware. In some embodiments each path 122, 124 can be realized with hardware dedicated individually for each path 122, 124. In practice, the primary and secondary channels are selected by the user of the portable two-way radio device 100.

The audio processing block 116 can determine the spectral and gain information of each of the primary and secondary audio signals. The spectral and gain information for each audio signal can be exchanged between the primary channel path 122 and the secondary channel path 124. Each channel path 122, 124 can use the spectral and gain information of the signal of the other path 122, 124 to spectrally reshape either or both of the primary and secondary audio signals, as well as to adjust the gain of either or both of the primary and secondary audio signals in order to audibly distinguish them from each other. The distinguished signals output by the primary and secondary channel paths 122, 124 are summed at a summing junction 126 or the equivalent. The combined or summed audio signal is then played over a speaker 128. The spectral reshaping is not a pitch shift, as is performed in some prior art devices. Rather, particular spectral characteristics are emphasized or de-emphasized in one of the audio signals based on the spectral characteristics of the other signal. The pitch of each signal can remain unchanged.

Figure 2:
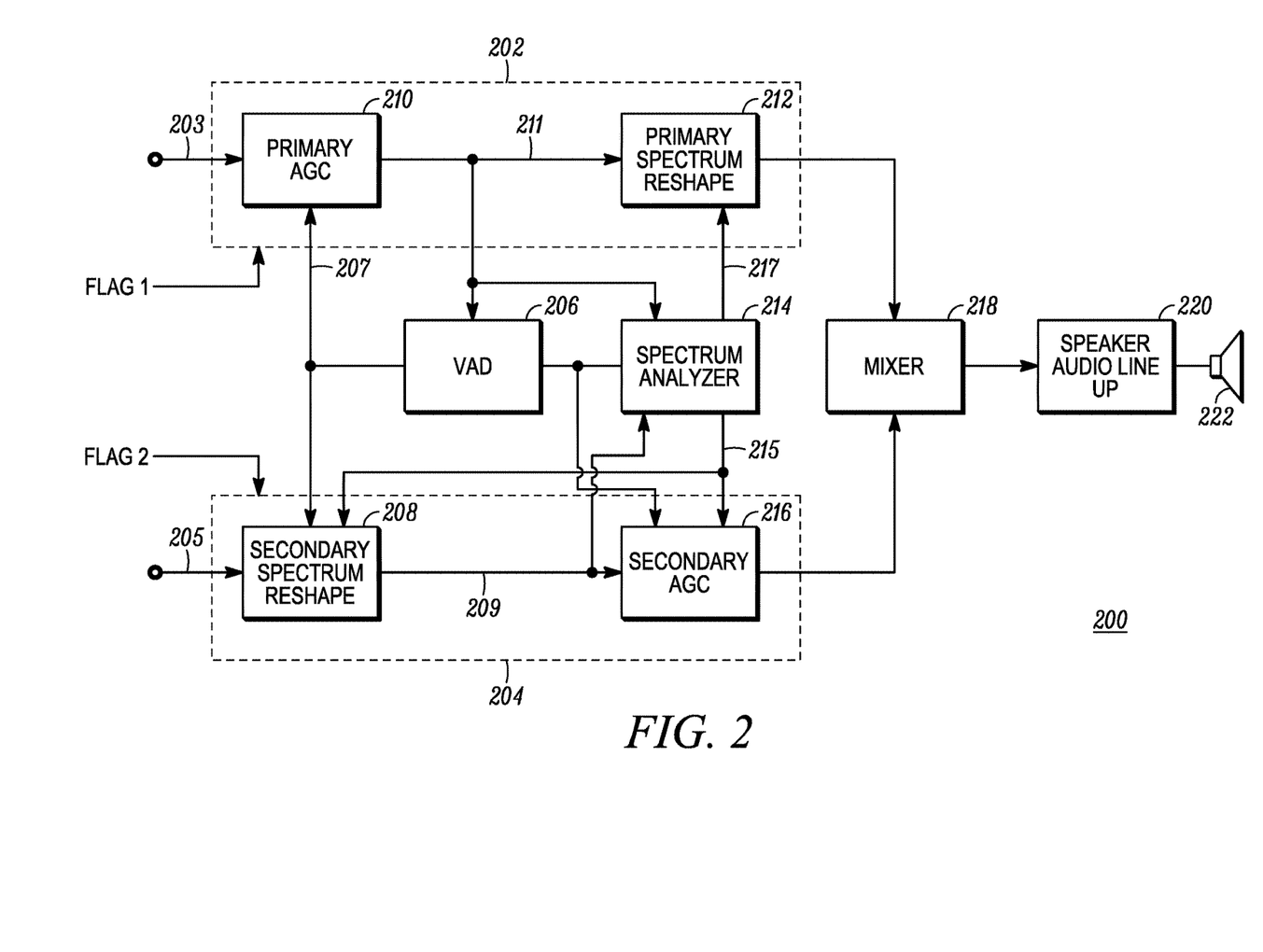
FIG. 2 is a block diagram of an audio processor for discriminating between two audio voice signals in accordance with some embodiments.

FIG. 2 is a block diagram of an audio processor 200 for discriminating between two audio voice signals in accordance with some embodiments. The audio processor 200 includes a first or primary channel path 202 and a secondary channel path 204. A primary flag, "flag 1," can be used to indicate reception on the primary channel, and a second flag, "flag 2," can be used to indicate reception of a signal on the secondary channel. Flag 1 and flag 2 can indicate that audio signal may be present in the corresponding signal path. The primary channel path 202 can adjust the gain and spectrally reshape a primary audio signal 203, and likewise, the secondary channel path 204 can adjust the gain and spectrally reshape a secondary audio signal 205. In addition to the primary and secondary channel paths 202, 204 the audio processor 200 further includes a voice activity detector (VAD) 206 and a spectrum analyzer 214. The output of each of the primary and secondary channel paths 202, 204 are mixed (summed) in a mixer 218 to produce a combined audio signal that is provided to a speaker audio line up 220 where the combined signal can be amplified and played over a speaker 222.

The VAD 206 samples the output by the primary automatic gain control (AGC) 210, which adjusts the gain of the primary audio signal 203 to provide a gain-adjusted primary audio signal 211. The VAD processes the gain adjusted primary audio signal 211 to determine whether it appears to include speech or not. When speech is present, a VAD flag 207 is set to indicate that speech is present. The VAD flag 207 is provided to the primary AGC 210 and to a secondary spectrum reshape block 208. Generally, when the VAD flag 207 is not set, indicating there is no speech in the primary audio signal, no action is required. If a secondary audio signal (i.e. on the secondary channel) is being received and the VAD flag is not set, the secondary audio signal can be processed conventionally. The VAD flag 207 is also provided to the spectrum analyzer 214 and a secondary AGC 216. The spectrum analyzer 214 receives the gain-adjusted primary audio signal 211 and the output of the secondary spectrum reshape block 208, which is a reshaped secondary signal 209, and it evaluates the spectral content of each of the primary and secondary audio signals by evaluating the gains adjusted in the primary audio signal 207 and the reshaped secondary signal 209. The energy and spectral information 215 of the primary audio signal are provided to the secondary spectrum reshape block 208 by the spectrum analyzer 214 for use in reshaping the spectrum of the secondary audio signal 205. The energy and spectral information 217 of the secondary audio signal are provided by the spectrum analyzer to the primary spectrum reshape block 212.

When audio signals are received over both the primary and secondary channels (i.e. primary and secondary audio signals 203, 205), and speech is present in the primary audio signal, the VAD 206 will assert the VAD flag 207, which can be used to enable reshaping and gain operations to distinguish the two audio signals. The spectrum analyzer can, for example, determine the total energy of the primary audio signal (via the gain-adjusted primary audio signal 211) and the energy in each of a plurality of sub-bands of frequency. Thus the spectrum analyzer 214 converts time domain signals into frequency domain signals to determine the energy in various frequency bands as well as the total energy for a sampled time period. In some embodiments the secondary spectrum reshape block 208 can evaluate the primary audio channel spectral information and reshape the spectral content of the secondary audio signal such as by use of an equalizer function to apply different filter coefficients in each of various frequency sub-bands of the secondary audio signal to reduce spectral overlap between the primary and secondary audio signals. In reshaping the spectral content of the secondary audio signal, the reshaping can be done dynamically, and can use smoothing to prevent abrupt changes in spectral content. The total energy of the primary audio signal (i.e. the gain-adjusted audio signal 211) can be used to dynamically adjust the secondary AGC to maintain the secondary audio signal within a preselected energy level of the primary audio signal at the mixer 218. Similarly, in embodiments where both the primary and secondary audio signals are spectrally reshaped, the primary spectrum reshape block 212 can use secondary spectral energy information 217 output by the spectrum analyzer 214 in response to analyzing the secondary audio signal to reshape the primary audio signal. Thus either or both of the primary or secondary audio signals can be spectrally reshaped to distinguish from the other audio signal. The output of the primary spectrum reshape block 212 can be a gain-adjusted and spectrally reshaped primary audio signal, which can be mixed at the mixer 218 with a gain-adjusted and spectrally reshaped secondary signal output from the secondary AGC 216. The mixed signal produced by the mixer 218 includes versions of both of the primary and secondary audio signals that have been processed to audibly distinguish them from each other, and is provided to the audio output section in the speaker audio line up 220.

It should be noted that throughout the discussion herein the terms "primary audio signal" and "secondary audio signal" are used to refer to the signals being processed by the primary channel path 202 and the secondary channel path 204, and those terms may be used to refer to intermediate states of the signals in those respective paths. It will be appreciated by those skilled in the art that, as the signal information proceeds along each path 202, 204, it may be changed. However, for the sake of example in the following discussion, it should be assumed that the primary audio signal refers generally to the signal processed by the primary channel path 202 including intermediate stages of the signal processed by the primary channel path 202, and that the secondary audio signal refers generally to the signal processed by the secondary channel path 204 including intermediate stages of the signal processed by the secondary channel path 204.

Figure 3:
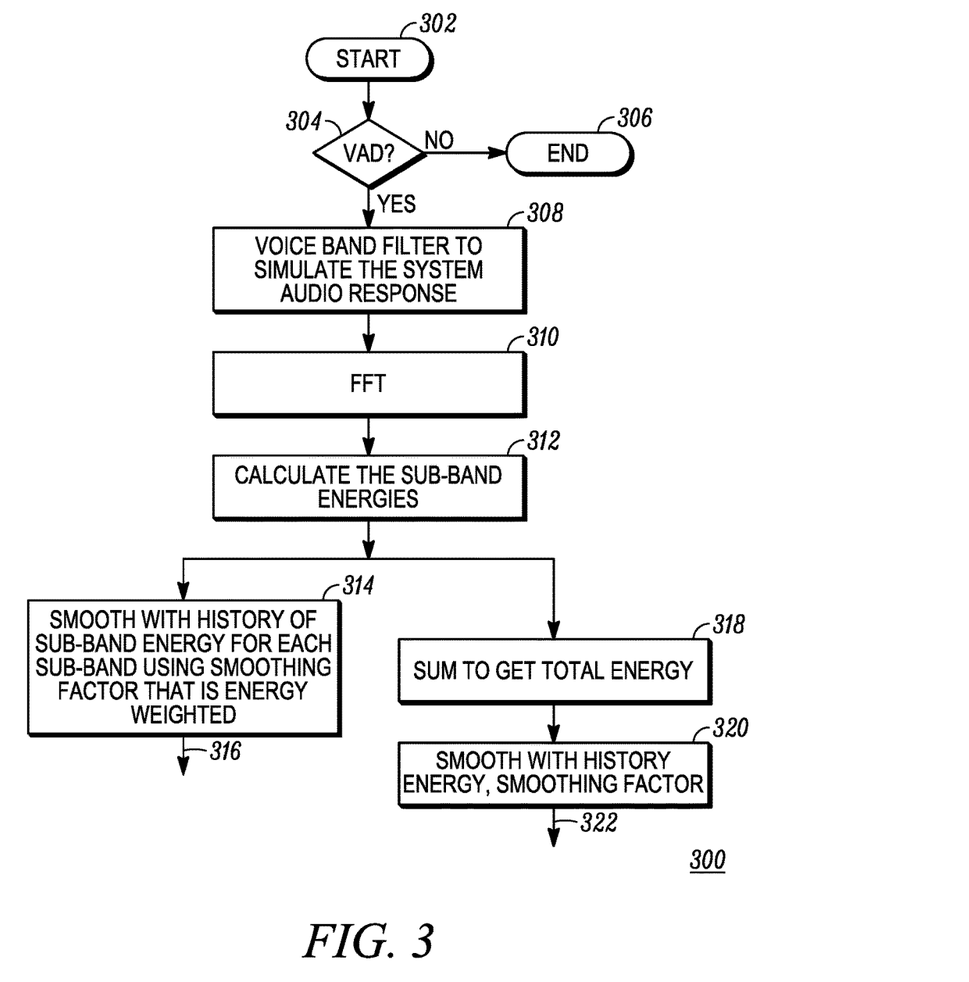
FIG. 3 is a flowchart diagram of a method for analyzing a spectrum of an audio voice signal in accordance with some embodiments.

FIG. 3 is a flowchart diagram of a method 300 for analyzing the spectrum of an audio voice signal in accordance with some embodiments. The method 300 can be performed, in some embodiments, by a spectrum analyzer such as spectrum analyzer 214 of FIG. 2. At the start 302 of the method 300 the audio processor is powered and ready to process signals in accordance with embodiments. A preliminary matter is determining whether the VAD flag is asserted in step 304. If not, then the method 300 ends 306 as there is no need to distinguish the signals if voice is not present. When voice activity is present, as indicated by the VAD flag being asserted, the method 300 can perform step 308, where a voice band filter is applied to the primary audio signal that simulates the audio response (in frequency) of the system, referring to the amplifier, speaker, and other audio output circuitry. The frequency response for the voice band filter can be determined prior to performing the method 300. After the filtering of step 308, if used, the spectrum analyzer determines the frequency domain spectrum of the audio signal, such as by performing a fast Fourier transform (FFT) in step 310. The frequency domain result is then analyzed in step 312 to determine the energy in each of a plurality of sub-bands. The sub-band energies can then be used in two different ways. In step 314 the sub-band energies are output 316 to the spectrum reshape block of the other audio signal for use in reshaping the spectrum of the other audio signal. The energy values can be "smoothed" such by, for example, a short term averaging, in order to avoid abrupt changes in sub-band energies. The sub-band energies can be compared to sub-band energies of the other audio signal in order to determine how to adjust one or both of the audio signals to spectrally distinguish them. In step 318 the sub-band energies can be totaled to determine a total audio signal energy. In step 320 the total energy value can be smoothed using a brief history of total energy values for the signal being processed, and output 322 to the AGC block of the other audio signal path in order to adjust the relative gains of the audio signals with respect to each other to further distinguish them from each other.

Figure 4:
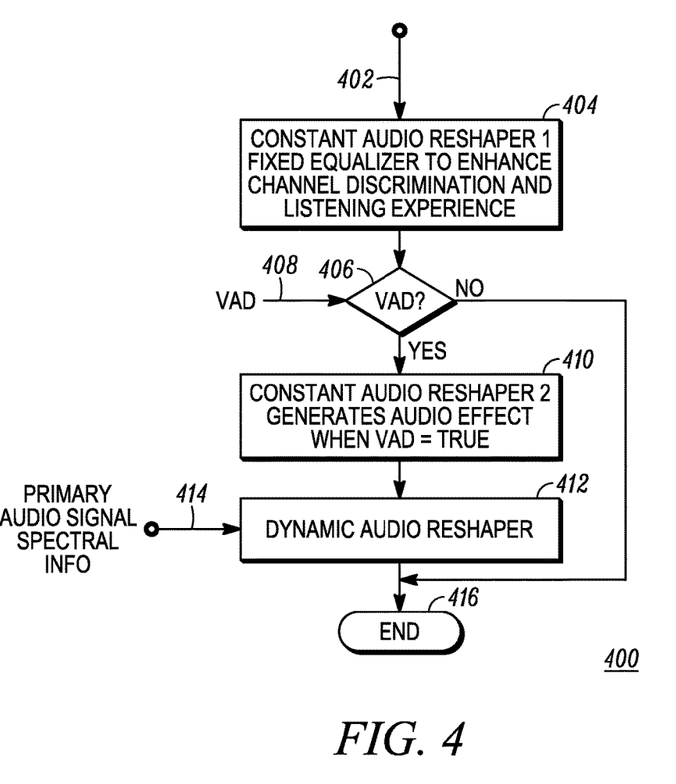
FIG. 4 is a flowchart diagram of a method for reshaping an audio spectrum of an audio voice signal in accordance with some embodiments.

FIG. 4 is a flowchart diagram of a method 400 for reshaping an audio spectrum of an audio voice signal in accordance with some embodiments. In particular, the method 400 is well-suited for the secondary spectrum reshape function. The secondary audio signal 402 is input into the method, and in step 404 an optional constant equalizer effect can be applied. In some embodiments the constant equalizer can be selected or configured by the user through a user interface. In step 406 the VAD flag input 408 can be evaluated to determine whether there is speech on the primary audio channel. If the VAD flag is not asserted then the method ends 416. If the VAD flag is asserted the method 400 proceeds to step 410 where a second constant audio reshaper can optionally be applied to produce a different audio effect when voice is present in the primary audio signal. By "constant" here it is meant that the reshaping performed in this step is not changed with respect to aspects of the audio signal, rather, it may be changed by user selection, but otherwise the filtering effect is not changed. In step 412 a dynamic audio reshaping can be applied to the audio signal that takes the sub-band energies of the primary audio signal into account.

For example, the sub-band energies can include a high band energy and a low band energy. The high band energy can be the energy in a portion of the upper or higher frequency content of the audio signal while the low band energy can be the energy content in a portion of the lower frequency content of the audio signal. The sub-band energies for each the primary and secondary audio signals can be determined. The ratio of one audio signal can be used to determine a target value for the other audio signal energy band ratio. That is, the target value can be defined as an offset from the ratio value of one audio signal. The particular frequency boundaries can be selected based on the particular application, and in some embodiments they can even overlap. In some embodiments a ratio of the high band energy to the low band energy can be determined for each channel, and the ratio value can be compared to a predetermined target value based on, for example, the ratio value of the other audio signal. Thus the target value represents a sufficient distinction between the two audio signals. The goal is to differentiate the two audio signals by, for example, emphasizing high band spectral content in one, such as the secondary audio signal. If both the primary and secondary channel audio signals have similar high band to low band ratios, then it is necessary to distinguish them by filtering one or both audio signals. When the difference between the ratio value of one audio signal and the determined target value is insufficient (i.e. less than a desired amount for distinguishing the two audio signals), the difference can be used to calculate coefficients for a filter that will reshape the high band energy to adjust it higher (or lower) as desired to achieve the desired difference between the high to low band ratios of the two audio signals. As with other adjustments, the filter coefficients can be smoothed using recent history of the filter band coefficients to avoid abrupt changes. Once the coefficients are calculated, the dynamic filter is applied to the audio signal to produce the spectrally reshaped audio signal and the method can then end (for the present sample) 416.

Figure 5:
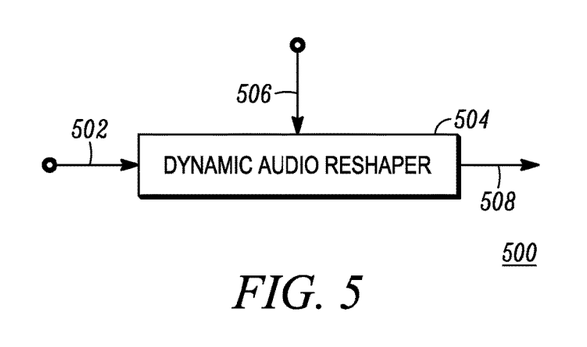
FIG. 5 is a flowchart diagram of a method for reshaping an audio spectrum of an audio voice signal in accordance with some embodiments.

FIG. 5 is a flowchart diagram of a method 500 for reshaping an audio spectrum of an audio voice signal in accordance with some embodiments. The method 500 is particularly suited for the primary channel reshape block 212 of FIG. 2, for example. The primary audio signal 502 is input to the dynamic audio reshaper 504. Likewise, the secondary audio signal spectral information (e.g. sub-band energies) 506 is also input into the dynamic audio reshaper 504. The dynamic audio reshaper 504 can then perform a reshaping function substantially similar to that of dynamic audio reshaper 412 of FIG. 4. The result is the output of a reshaped primary audio signal 508.

Figure 6:
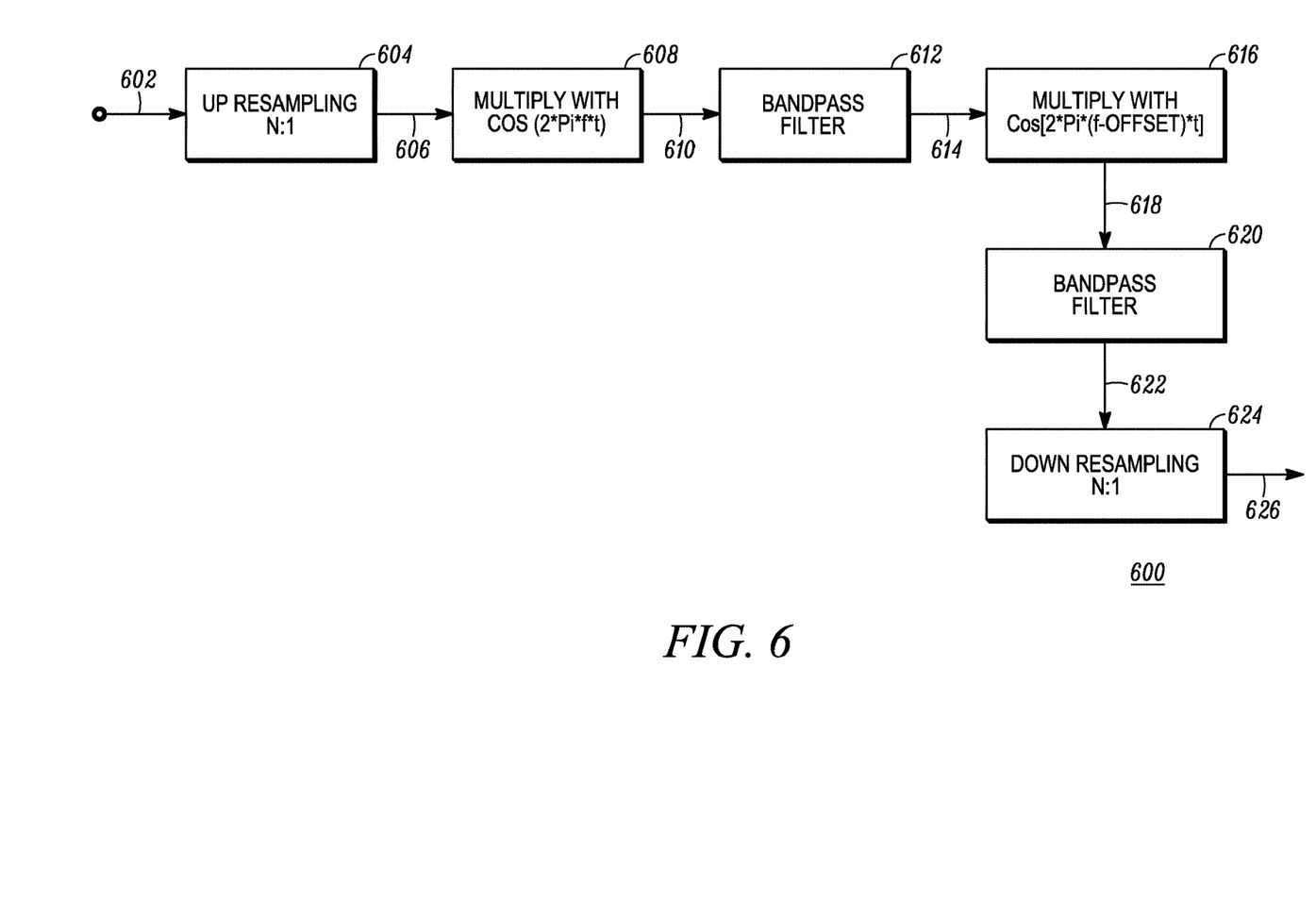
FIG. 6 is a flowchart diagram of a method for relocating the spectrum of an audio voice signal in accordance with some embodiments.

FIG. 6 is a flowchart diagram of a method 600 for relocating the spectrum of an audio voice signal in accordance with some embodiments. In addition to spectrum reshaping to distinguish two or more audio signals, in some embodiments one or more of the audio signals may be spectrally shifted to further provide audibly perceptible distinction between the audio signals. The method 600 is not shown in the audio processor 200 of FIG. 2, but it can be performed at any point in the processing, assuming the signal being shifted is in digital form. The method 600 can be conditionally performed, based on the relative locations of the energy peak of each audio signal. For example, each audio signal can be evaluated in several frequency sub-bands to identify the sub-band with the highest energy. The bandwidth of the sub-bands should be narrow enough to reasonably identify the frequency where the peak energy occurs. In some embodiments each audio signal can be divided into sixteen sub-bands across the entire bandwidth being processed, and the sub-band of those sixteen sub-bands having the highest energy can be identified as the peak energy. Once the peak energy bands of each audio signal are identified, the difference in the peak locations of the two audio signals can be determined. If the peak difference is less than a pre-selected threshold, then the method 600 can be used to shift one or both of the audio signals in frequency to separate them in frequency by a desired frequency difference. For example, an offset can be determined as the difference between the pre-selected threshold difference desired and the actual difference between peek locations, multiplied by the sub-band bandwidth (which is 250 Hz when a 4 kHz voice signal is divided into sixteen sub-bands). The determined offset is then used by method 600 to shift one of the audio signals.

When method 600 is invoked, an input audio signal 602, which can be, for example, either the primary audio signal or the secondary audio signal, is first up-sampled in step 604 by an up-sampling factor N, which increases the number of samples for a given audio time segment of the audio signal being processed by the method 600. An up-sampled signal 606 is then modulated in step 608 by multiplying it with a tone of frequency "f" to produce a modulated signal 610 which is bandpass filtered in step 612. The bandpass filtered signal 614 is then demodulated in step 616 by multiplying the bandpass filtered (modulated) signal 614 using a frequency offset that was determined previously to produce a demodulated signal 618, which is again bandpass filtered in step 620 to eliminate harmonic spectra. The demodulated bandpass filtered signal 622 is then down-sampled to the original sampling rate in step 624 to provide shifted signal 626. The shifted signal 626 is a frequency-shifted version of the original audio signal (i.e. the secondary audio signal) that is shifted by a desired frequency shift to audibly distinguish it from the other signal (i.e. the primary audio signal) to which it was compared.

Figure 7:
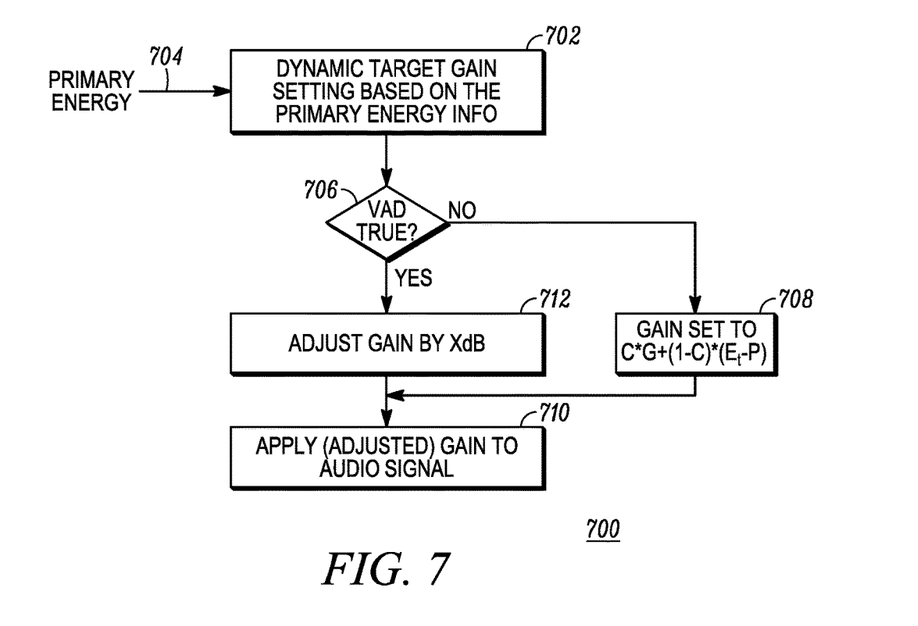
FIG. 7 is a flowchart diagram of a method for adjusting a gain of an audio voice signal in accordance with some embodiments.

FIG. 7 is a flowchart diagram of a method 700 for adjusting a gain of an audio voice signal in accordance with some embodiments. The method 700 is suitable for use, for example, in the secondary AGC 216 of FIG. 2, in some embodiments. As a preliminary matter, the energies of the primary and secondary audio signals (e.g. 209 of FIG. 2) are known, as calculated by, for example, the spectrum analyzer 214 of FIG. 2. In step 702 the primary audio signal energy 704 is used to select a target gain for the secondary audio signal. In some embodiments a gain smoothing is used in determining a gain target to account for the start or end of either of the primary or secondary audio signals while the other audio signal is being received. Thus, the target gain can be determined in some embodiments by applying a smoothing factor "c" (which is less than 1) to a prior target gain value (or an average of prior target gain values) plus the sum of the complement of the smoothing factor (i.e. "1-c") multiplied by smoothed energy of the primary audio signal (for the same time frame) minus a predetermined constant P, the equation of which is as follows:

$$Gtarget_n = c*Gtarget_{n-1} + (1-c)*(E_t - P)$$

Where:

$Gtarget_n$ is the gain target for the present time frame;

c is the smoothing factor;

$Gtarget_{n-1}$ is the historical value of the gain target;

$E_t$ is the primary audio signal energy for the present time frame; and

P is an offset constant in decibels.

Once the gain target is determined, the method 700 proceeds to step 706 where the state of the VAD flag is evaluated. When the VAD flag is not asserted, indicating there is no voice detected in the primary audio signal, the gain is set to the gain target $Gtarget_n$ in step 708. When the VAD flag is asserted, indicating there is voice detected in the primary audio signal, then the gain of the secondary audio signal is adjusted in step 712 by the gain target $Gtarget_n$ minus a predetermined constant X decibels; $Gtarget_n - X$. The determined gain adjustment, as determined in either steps 708 or 712, is then applied in step 710 to the secondary audio signal.

Figure 8:
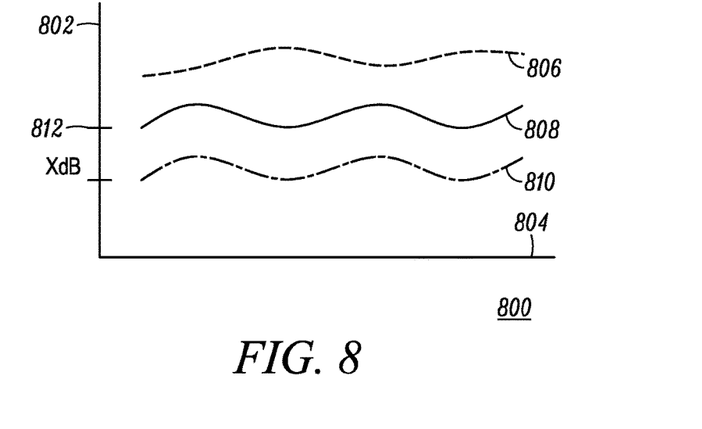
FIG. 8 is a signal diagram of a first audio voice signal and a second audio voice signal showing the effect of adjusting the gain on the second audio voice signal.

FIG. 8 is a signal diagram 800 of a first audio voice signal and a second audio voice signal showing the effect of adjusting the gain on the second audio voice signal in accordance with some embodiments. The diagram is a graph of time along the horizontal axis 804 and signal energy along the vertical axis 802. The diagram 800 shows the effect of method 700 when the VAD indicates voice content is detected and not detected. The first audio signal energy 806 is graphed over time and can be, for example, the energy of a primary audio signal being received by a portable two-way radio device. A first energy curve 808 of the second audio signal shows the energy when the VAD flag is not asserted, and a second energy curve 810 indicated the adjusted gain of the second audio signal when the VAD flag is asserted. The difference between the first and second energy curves 808, 810 is X dB, as determined by the method 700 of FIG. 7.

Figure 9:
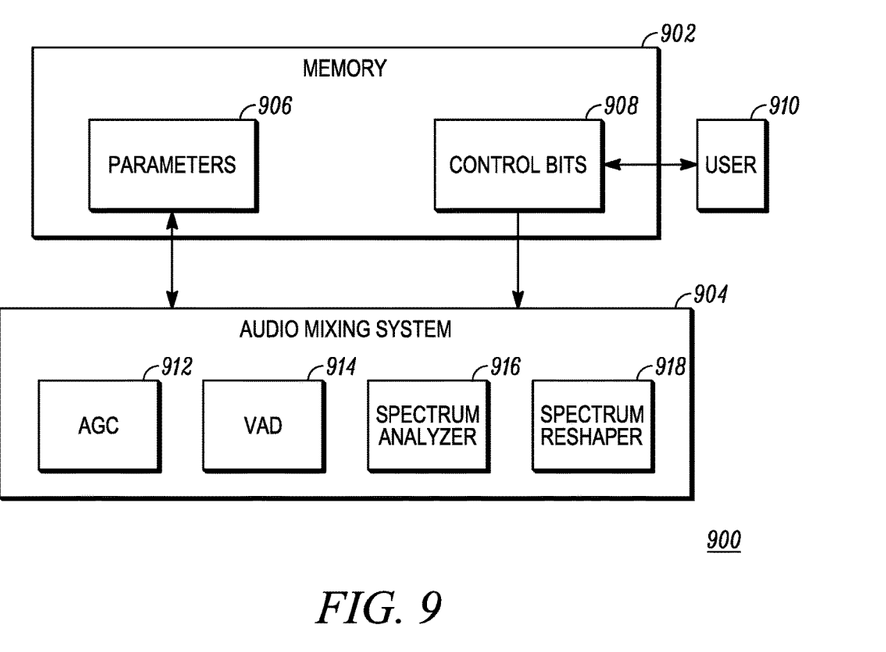
FIG. 9 is a block diagram of a memory arrangement for an audio mixing system in accordance with some embodiments.

FIG. 9 is a block diagram of a memory arrangement 900 for an audio mixing system in accordance with some embodiments. The memory arrangement 900 shows storage of various user settings and historical information that is used to reshape, re-gain, and potentially frequency shift signals in order to audibly distinguish one signal from another when those signals are played over an in-common speaker. A memory 902 holds data for the audio mixing system 904, which can be, for example, and audio processor such as that shown in FIG. 2. The memory 902 stores parameters 906 which can include gain settings, energy history values, and so on. The memory can also store control bits 908 indicating preferences input by a user 910 for use in audibly distinguishing signals. For example the user bits can indicate a preferred amount of spectral reshaping, a preferred amount of gain differentiation, and so on. The parameters 906 and control bits 908 can be used by, for example an AGC function 912, a VAD function 914, a spectrum analyzer function 916, and a spectrum reshaping function 918.

Figure 10:
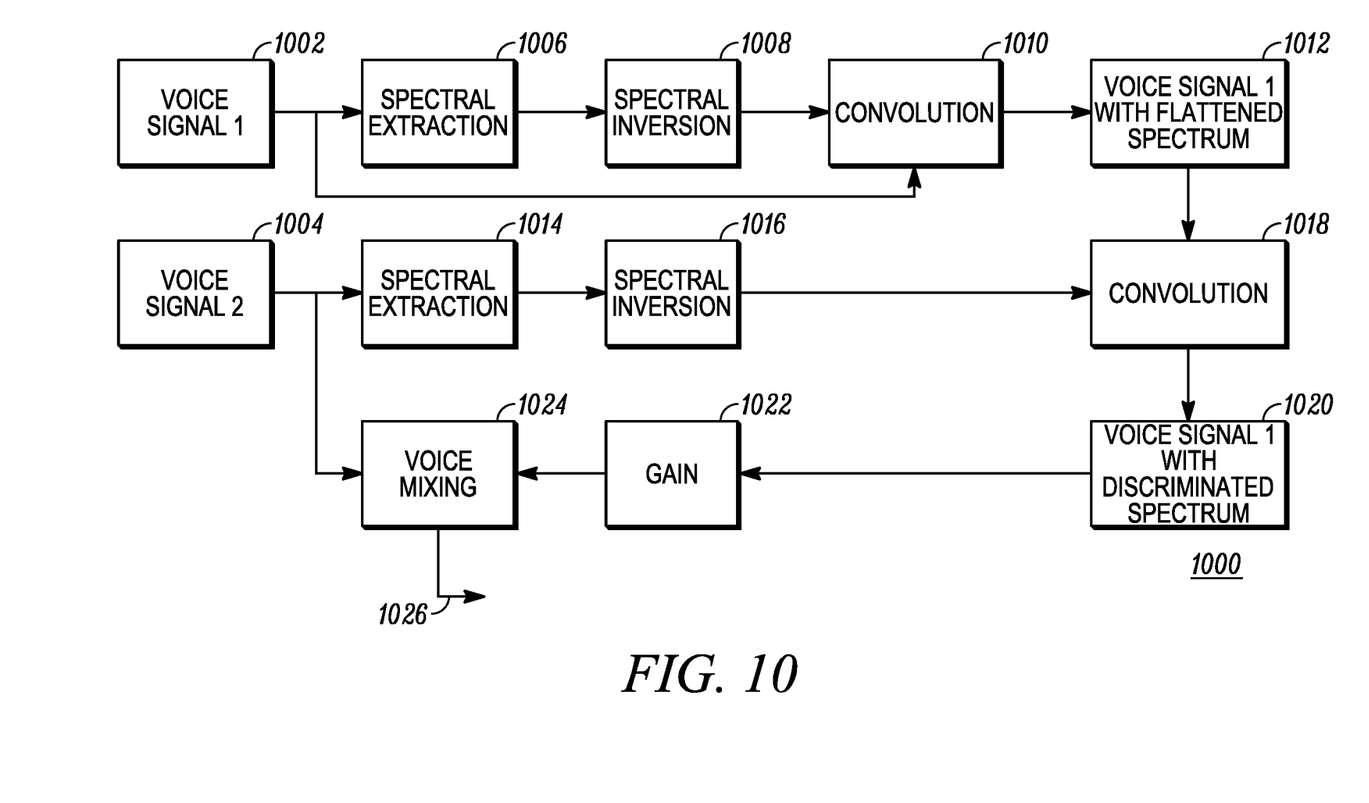
FIG. 10 is a flow chart diagram of a method for spectrally reshaping a first audio voice signal to discriminate it from a second audio voice signal.

FIG. 10 is a flow chart diagram of a method 1000 for spectrally reshaping a first audio voice signal to discriminate it from a second audio voice signal. The method 1000 represent alternative embodiments for audibly distinguishing audio signals using spectral reshaping of one of the audio signals. In the method 1000 a first voice signal 1002 and a second voice signal 1004 are to be played over an in-common speaker. Spectral characteristics of each signal 1002, 1004 can be similar in many cases. First voice signal 1002 can be a primary audio signal received over a primary channel of a portable two-way radio device, and the second voice signal can be a secondary audio signal received over a secondary channel of a portable two-way radio device employing dual watch capability.

In the method 1000, a spectral extraction is performed on the first voice signal in step 1006, converting the time domain to the frequency domain for a given time frame of the first voice signal, yielding the spectrum of the first voice signal for the time frame under consideration in a plurality of sub-bands or other discrete frequency units. In step 1008 the spectrum of the first voice signal is inverted, meaning the spectrum is flipped about a center frequency. For example, a reference frequency of 1 kHz can be selected as a center frequency. During inversion, the amplitude of the voice signal at 500 Hz will be compared to the amplitude at 1 kHz and the difference will be multiplied by two. The resulting value will be applied to amplify or attenuate the voice signal amplitude at 500 Hz, depending on whether the voice amplitude at 500 Hz is higher or lower than the center frequency. If the voice amplitude at 500 Hz is higher than the amplitude at 1 kHz, then the voice amplitude at 500 Hz will be attenuated. If the voice amplitude at 500 Hz is lower than the amplitude at 1 kHz, then the voice amplitude at 500 Hz will be amplified. A convolution is then performed in step 1010, convolving the inverted spectrum with the original spectrum to produce a flattened spectrum in step 1012. Similarly, the second voice signal's spectrum is determined in step 1014, and inverted in step 1016 to produce an inverted second spectrum which is convolved with the flattened spectrum of the first voice signal in step 1018, producing a discriminated version of the first voice signal in step 1020. In step 1022 gain can be applied to the discriminated spectrum of the first voice signal, and in step 1024 the gain-adjusted discriminated voice signal resulting from the first voice signal can be mixed with the second voice signal to produce a mixed signal 1026 that can be provided to a speaker output path for amplification and playing over a speaker. In addition to the internal speaker of a portable two-way radio device, the mixed signal 1026 can also be played by audio accessories such as the remote speaker mic, headset, and other audio playback transducers.

The various embodiments disclosed herein provide the benefit of audibly distinguishing audio voice signals in systems where two or more such voice signals are played over the same speaker at the same time. Problems associated with the prior art are avoided by the use of spectral reshaping, which can be further combined with gain offset adjustment and/or frequency shifting. By applying techniques exemplified by the disclosed embodiments similarly sounding voice signals can be more audibly distinguished when played over the same, or co-located audio transducers where binaural hearing is otherwise unable to distinguish the resulting acoustic signals.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for differentiating audio signals when played together over a speaker, comprising:
   receiving, at the same time, a primary audio signal on a primary channel and a secondary audio signal on a secondary channel;
   spectrally reshaping at least one of the primary audio signal and the secondary audio signal based on spectral content of the other audio signal to produce resulting signals including at least one reshaped signal;
   mixing the resulting signals; and
   playing the resulting signals over the speaker.

2. The method of claim 1, wherein spectrally reshaping is performed in response to detecting voice content in the primary audio signal.

3. The method of claim 1, further comprising adjusting a gain of at least one of the resulting signals to maintain a preselected gain offset between the resulting signals.

4. The method of claim 3, wherein the preselected gain is based on the instantaneous energy of the primary audio signal.

5. The method of claim 1, wherein spectrally reshaping is performed continuously based on spectral comparison of the spectral content of the primary and secondary audio signals.

6. The method of claim 1, wherein spectrally reshaping is performed by calculating an energy level in each of a plurality of sub-bands of the primary and secondary audio signals and applying a dynamic equalization adjustment to at least one of the primary and secondary audio signals.

7. The method of claim 6, wherein, prior to calculating the energy level in each of the plurality of sub-bands, applying a voice filter to the primary and secondary channels that is based on an audio response of the speaker.

8. The method of claim 1, wherein spectrally reshaping comprises:
   determining a secondary channel energy ratio of a high sub-band energy to a low sub-band energy of the secondary audio signal;
   when the secondary channel energy ratio is below a target value, determining a difference between the secondary channel energy ratio and the target value;
   determining at least one filter coefficient necessary to spectrally reshape the secondary audio channel to produce a reshaped secondary audio signal having a high sub-band to low-sub-band ratio that meet the target value; and
   filtering the secondary audio signal with a filter using the filter coefficient.

9. The method of claim 1, wherein spectrally reshaping comprises:
   determining a spectral energy content in plurality of sub-bands of each of the primary and secondary audio signals;
   determining a primary peak energy sub-band in the primary audio signal and a secondary peak energy sub-band in the secondary audio signal;
   determining a frequency difference between the primary peak energy sub-band and the secondary peak energy sub-band;
   when the frequency difference between the primary peak energy sub-band and the secondary peak energy sub-band is less than a target frequency difference value, spectrally shifting at least one of the primary audio signal and the secondary audio signal to increase the frequency difference between the primary peak energy sub-band and the secondary peak energy sub-band.

10. The method of claim 1, wherein spectrally reshaping comprises:
    flattening a spectrum of the primary audio signal to produce a flattened primary audio signal; and
    convolving the flattened primary audio signal with a spectrally inverted version of the secondary audio signal to produce a discriminated primary audio signal.

11. The method of claim 10, wherein flattening the spectrum of the primary audio signal comprises producing a spectrally inverted version of the primary audio signal; and
    convolving the spectrally inverted version of the primary audio signal with the primary audio signal.

12. A portable two-way radio device, comprising:
    a first channel receiver over which a first audio signal is received;
    a second channel receiver over which a second audio signal is received;
    an audio processor that spectrally reshapes the second audio signal based on spectral content of the first audio signal to produce a reshaped second audio signal and mixes the first audio signal and the reshaped second audio signal to produce a mixed audio signal; and
    a speaker over which the mixed audio signal is played.

13. The portable two-way radio device of claim 12, wherein the audio processor reshapes the second audio signal in response detection of voice content in the first audio signal.

14. The portable two-way radio device of claim 12 wherein the audio processor adjusts a gain of reshaped second audio signal to maintain a preselected gain offset between the first audio signal and the reshaped second audio signal.

15. The portable two-way radio device of claim 14, wherein the preselected gain is based on the instantaneous energy of the first audio signal.

16. The portable two-way radio device of claim 12, wherein the audio processor determines a first ratio of a high sub-band energy to a low sub-band energy of the first audio signal and a second ratio of a high sub-band energy to a low sub-band energy of the second audio signal and determines a target value that is a preselected offset from the first ratio;
    the audio processor determines a difference between the second ratio and the target value and determines at least one filter coefficient necessary to filter the second audio signal to produce the reshaped second audio signal, wherein the reshaped second audio signal has a high sub-band to low-sub-band ratio equal to the target value.

17. The portable two-way radio device of claim 12, wherein the audio processor determines a spectral energy content in plurality of sub-bands of each of the first and second audio signals;
    the audio processor further determines a first peak energy sub-band in the first audio signal and a second peak energy sub-band in the second audio signal;
    the audio processor further determines a frequency difference between the first peak energy sub-band and the second peak energy sub-band;
    when the frequency difference between the first peak energy sub-band and the second peak energy sub-band is less than a target frequency difference value, the audio processor spectrally shifts at least one of the first audio signal and the second audio signal to increase the frequency difference between the first peak energy sub-band and the second peak energy sub-band by a preselected difference.

18. An audio processor, comprising:
    a primary channel path, including a primary automatic gain controller followed by a primary spectrum reshaper, that processes a primary audio signal;
    a secondary channel path, including a secondary spectrum reshaper followed by a secondary automatic gain controller, that processes a secondary audio signal;
    a voice activity detector that detects voice in the primary audio signal at an output of the primary automatic gain controller;
    a spectrum analyzer that determines spectral content of the primary audio signal and the secondary audio signal;
    the secondary spectrum reshaper reshapes a spectrum of the secondary audio signal based on spectral content of the primary audio signal;
    a mixer that sums the output of the primary channel path and the secondary channel path to produce a mixed signal; and
    a speaker over which the mixed signal is played.

19. The audio processor of claim 18, wherein the secondary channel path reshapes the spectrum of the secondary audio signal when the voice activity detector detects voice in the primary audio signal.

20. The audio processor of claim 18, wherein the secondary automatic gain controller adjusts a gain of the secondary audio signal based on an energy of the primary audio signal.

* * * * *